United States Patent [19]

Holz

[11] 4,416,218
[45] Nov. 22, 1983

[54] PROCESS AND APPARATUS FOR FEEDING POULTRY

[76] Inventor: Wolfgang Holz, 8091 Hart-Ramerberg, Oberbayern, Fed. Rep. of Germany

[21] Appl. No.: 175,957

[22] Filed: Aug. 7, 1980

[30] Foreign Application Priority Data

Aug. 7, 1979 [DE] Fed. Rep. of Germany ....... 2932040

[51] Int. Cl.³ .................... A01K 5/02; A01K 39/012
[52] U.S. Cl. ................................. 119/18; 119/51 R; 119/51.11; 119/52 AF
[58] Field of Search ............... 119/51 R, 51.11, 56 R, 119/52 AF, 18

[56] References Cited

U.S. PATENT DOCUMENTS

| | | | |
|---|---|---|---|
| 3,303,822 | 2/1967 | Cohen | 119/51 R |
| 3,303,823 | 2/1967 | Cohen | 119/51.11 |
| 3,319,606 | 5/1967 | Virgil | 119/51 R |
| 3,553,441 | 1/1971 | Launder | 119/51 R |
| 3,929,277 | 12/1975 | Byrne et al. | 119/51 R |

Primary Examiner—Hugh R. Chamblee
Attorney, Agent, or Firm—Price, Heneveld, Huizenga & Cooper

[57] ABSTRACT

Process and apparatus for feeding poultry in which a given amount of feed is periodically supplied and the dung and eggs are continuously removed. The weight of a small number from a group of animals living under like conditions is continuously monitored, and the respective feeding period is ended when the weight reaches a predetermined value. The apparatus includes at least one cage which is connected to an apparatus for supply of feed and to an apparatus for removal of eggs. The cage has a grid floor for passage of dung. The grid floor forms the load-carrier of a balance. The balance has a switch which opens and closes at a given weight to actuate the working circuit of the apparatus for supply of feed.

10 Claims, 4 Drawing Figures

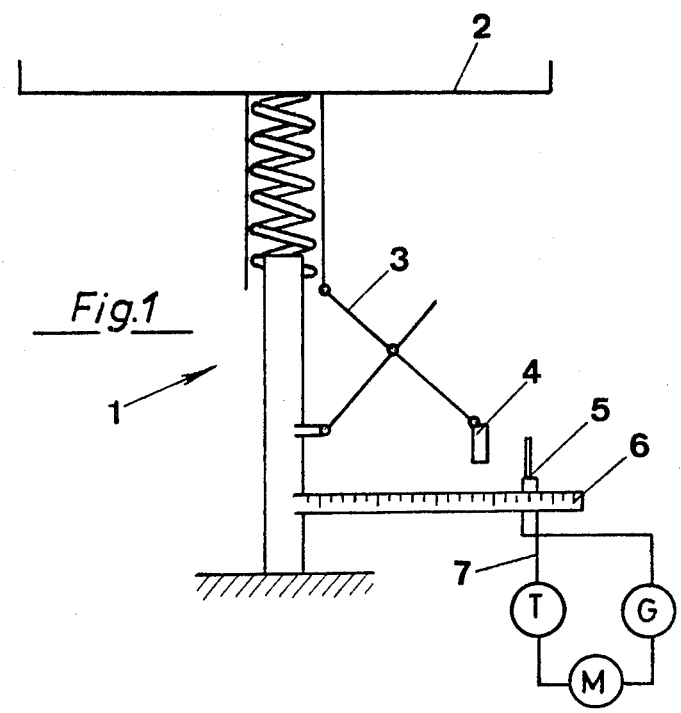
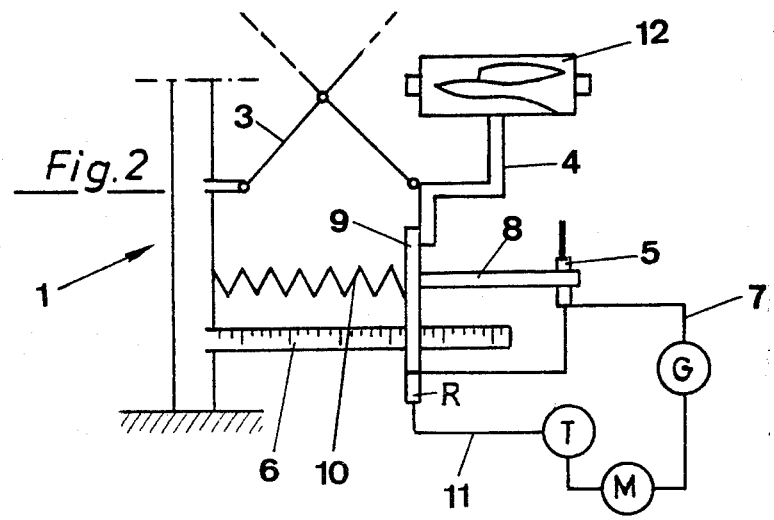

PROCESS AND APPARATUS FOR FEEDING POULTRY

The invention relates to a process and an apparatus for feeding poultry, in which a given amount of feed is periodically supplied and the dung and eggs are continuously removed.

BACKGROUND OF THE INVENTION

If animals are allowed to eat as much as they want, the feed consumption is made up of maintenance consumption, productive consumption, and luxury consumption. The maintenance consumption represents the minimum requirement without affording the possibility of weight gain and/or egg production. For these, the productive consumption is required. The luxury consumption is ingested in addition and leads to a further weight gain.

The food requirement of animals is subject to large fluctuations. These depend on the age of the animals, the time of year, the feed composition, the plumage, and the stall climate, i.e. temperature, air humidity, oxygen content, light intensity etc. There exists the corresponding danger than if a given amount of feed per day is used, in order to prevent luxury consumption, the animals receive either too much or too little feed. Too much feed raises costs. The luxury consumption can anyway amount to 5-15%, so that a saving can mean an additional profit of 100%. Hence it happens that, in particular towards the end of the laying period, there exists the danger of the so-called fatty liver syndrome, which leads to bad eggshells and increased losses. As against this, too little feed can reduce the production consumption.

In the raising of young hens it is theoretically possible to supply a given amount of feed per day, in order to prevent luxury consumption, and to accept now and then a restriction of the production consumption, i.e., a reduction in the increase in weight; however, up to now this exact supply presented a considerable technical problem, in particular in the upkeep of laying batteries. Accordingly, luxury consumption in the rearing of young hens is permitted, particularly since the goal of rearing is, anyway, the reaching of a given minimum weight.

In the feeding of laying hens, on the contrary, the provision of a given amount of feed per day is debarred. The animals can enter a dip in production, to overcome which they require, according to circumstances, several days.

A process is already known in which a few hundred laying hens are allowed to eat freely and the feed requirement for the rest of the animals is calculated from the amount of feed consumed, subtracting the percentage of luxury consumption. Apart from the fact that this process is costly in time and work, the problem also arises here of supplying the animals with given amounts of feed. Metering screws are used, which supply the individual cages, and in fact in dependence on the number of animals contained in each cage. The cost of apparatus is considerable, and the plants are correspondingly expensive.

SUMMARY OF THE INVENTION

The object of the invention is to provide a possibility of automatic restrictive feeding to prevent luxury consumption.

To achieve this object, the process according to the invention is characterized in that the weight of a small number of animals from a group of animals living under the same conditions is continuously monitored and the respective feeding period is ended when the weight reaches a predetermined value.

This process can be easily supervised. The weight values are very suitable for fully automatic control. Additional processes of work are eliminated. The same holds for a costly apparatus.

To achieve adaptation to different circumstances, the said predetermined value can be adjusted, according to the invention.

Preferably, the predetermined value is an absolute weight limit. This kind of process is used in the feeding of laying hens. The aim is to ensure that the animals do not exceed a given maximum weight. For a light breed of layers, this is for example 1,700 g. This weight would normally rise in the last ten months of the laying period, with unrestricted feeding, to about 1,900 g. The difference corresponds to the luxury consumption during this period. By limitation of the weight to 1,700 g, it is thus ensured that the luxury consumption is omitted, but that however on the other hand the animals are always offered the required production consumption in dependence on their fluctuations in need. The resulting saving in the amount of feed is raised still further because the leaner animals are better feed converters. Contributing to this is the increase of laying production due to the hormonal processes of egg development proceeding more favorably than in fatter animals. Finally, the danger of fatty liver syndrome is eliminated.

When the rearing of young hens is concerned, the process according to the invention is characterized in that the predetermined value is the sum of the sum of the initial weight at the beginning of the feeding period and the predetermined feed weight. Thus exactly measured amounts of feed are always fed to the animals. When the animals age and reach the laying period, they are somewhat lighter than in the case of free feeding. Hence the beginning of laying can be somewhat delayed. However, this is more than equalized in that the animals subsequently begin immediately with the laying of larger eggs. Apart from this, the saving of feed is of course considerable. Added to which, the animals are trained from the beginning to be good feed converters.

In addition, this process can also be employed during the first phase of 1 to 3 months of the laying period, in which the weight of the animals rises from that of a young hen ready to lay to the predetermined maximum weight, which is 1,350 g to 1,700 g. in the case of a light breed. The predetermined maximum weight is calculated, as for the rest, from the weight of a hen fed ad libitum in the tenth month, less 10-15%.

The invention furthermore provides an apparatus which is particularly suitable for carrying out the process according to the invention, with at least one cage, which is connected to an apparatus for feed supply and to an apparatus for egg removal, and which also has a grid floor to pass the droppings, this apparatus being characterized in that at least the grid floor of the cage forms the load-carrier of a balance, and that the balance has a switch which opens and closes at a given weight to actuate the working circuit of the apparatus for feed supply. It is possible to arrange the grid floor to be movable relative to the cage, or else to construct the whole cage as the load carrier of the balance.

The switch is preferably adjustable to different weights, each setting taking account of the fact that after switching off the feed supply apparatus, for example, a feed chain or feed belt, a residue of feed always still remains before the animals and will subsequently be consumed and lead to a further increase in weight.

According to a further advantageous feature, the apparatus according to the invention can be characterized by a time switch in the working circuit of the feed supply apparatus. This time switch is set such that the feeding period starts at the same time every day, as a rule in the afternoon of the birds' day. The weight of the animals then increases during eating to the value at which the switch switches off the feed supply apparatus. The weight then still increases a little due to consumption of the remaining feed. Through droppings, and later through egg-laying, the weight then falls again below the weight at which the switch turns on. Before this happens, the time clock must have switched off, in order to prevent a premature start of the next feeding period. The mode of operation with the time clock prevents oscillation of the control about the switching value.

The said adjustability of the switch enables the maximum weight of the laying hens to be set. When the rearing of young hens is concerned, the apparatus can be characterized, according to the invention, by a device for readjusting the switch distance between the switch and its tripping mechanism in dependence on the setting of the latter at the beginning of the feeding period. The aim is thus for the consumption of a predetermined amount of feed not to be exceeded, independently of the respective absolute weight of the animals, during each feeding period.

A preferred constructional embodiment of this apparatus consists in that the tripping device, connected to the movable load carrier of the balance, forms a driver-stop for a runner which is spring-loaded in the weight increase direction of motion, and which can be fixed to the immovable part of the balance at the beginning of the feeding period and carries the switch, the distance of which from the runner is adjustable. With an increase of weight, the runner is thus driven by the tripping device and guided into the position which corresponds to the weight of the animals at the beginning of the feeding period. The runner is then fixed, for example by a relay controlled by the time clock. During the increase in weight, the tripping device moves alone, and reaches the switch held by the runner. When in addition the time clock switches off, the runner is released and is moved up to the tripping device by the spring loading in the weight increase direction of movement, on which the cycle repeats.

The apparatus according to the invention is suitable for floor rearing as well as for poultry-keeping in batteries. In the latter case there is the problem that in the initial phase of the feeding period the cages situated to the front get a lead in feed, i.e., until the feed reaches the rearward cages. This lead is not equalized at the end of the feeding period, but can even increase, since the residual feed remains in front of each cage. In order to take account of this circumstance, it is proposed that the cage according to the invention—seen in the direction of motion of the apparatus for feed supply—is the last of a battery of cages. It is thus ensured that all animals obtain the minimum amount of feed.

As a rule the setting is chosen such that the animals in the first cage receive somewhat more, and the animals in the last cage somewhat less, than the feed limit set. To facilitate such a gradation, it is advantageous that at least the first cage of the cage battery is likewise provided with a balance.

Furthermore, there exists the possibility according to the invention of equipping the feed supply apparatus with an overdrive. In this way it is possible to reduce to a minimum the feed lead of the animals in the first cage, since namely the feed to all cages begins almost simultaneously.

According to another feature of the invention, the balance can be provided with a weight indicator and/or be connected with a printer to record the weight with respect to time, and/or can have a damping mechanism.

BRIEF DESCRIPTION OF THE DRAWINGS

Further advantages and features of the invention can be seen from the following description of preferred embodiments, in connection with the attached drawing. The drawing shows, in:

FIG. 1, schematically, a first embodiment of the apparatus according to the invention;

FIG. 2, similarly, a second embodiment;

DETAILED DESCRIPTION OF THE INVENTION

Figure 3:
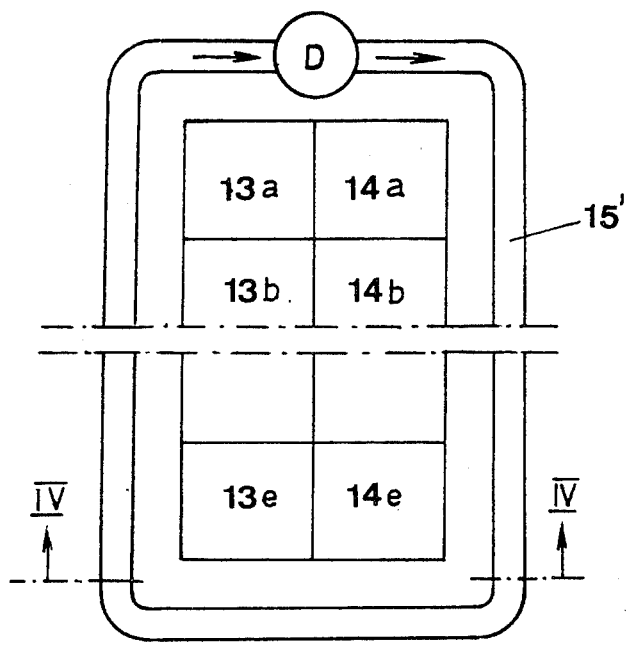
FIG. 3, a schematic outline of a cage battery.

FIG. 1 shows a balance 1 the load-carrier 2 of which is formed by the floor of a cage or by the floors of several united cages. The number of animals whose weight is constantly monitored can be up to a hundred and more, but preferably is two to five. A slidable lattice gate 3 is arranged between the movable and the stationary part of the balance, and carries a horizontally movable tripping device 4. The tripping device actuates a switch 5, which is seated on a rod of the stationary balance part and is longitudinally adjustable on this. The rod 6 carries a scale.

The switch 5 is in the working circuit 7 of a motor M for a feed supply apparatus (not shown). Besides a current source G, this working circuit also contains a time clock T.

The time clock switches on a feeding period, upon which the tripping device travels to the right as the weighed animals consume an increasing amount of feed, and actuates the switch 5. The motion to the right then continues a little further and subsequently reverses. Before the tripping device 4 again reaches the switch 5, the time clock T has switched off, in order to leave the control mechanism unactuated until the next feeding period.

The apparatus according to FIG. 1 controls, at each feeding period, the maximum attainable weight of the animals.

According to FIG. 2, the lattice gate 3 likewise again carries the tripping device 4 to actuate the switch 5. This, however, is not seated directly on the rod 6, but instead on an arm 8 of a runner 9, which is displaceable on the rod 6 and can be arrested relative to it. The runner 9 is loaded towards the right by a compression spring 10.

After the end of a feeding period, the tripping device 4 is moved to the left and hence drives the runner 9 against the action of the compression spring. As soon as the time clock initiates a new feeding period, it excites via a circuit 11 a relay R on the runner 9, so that this is held fast in its position. The tripping device 4 then travels alone to the switch 5 and interrupts the feeding period, as soon as the animals have consumed a given amount of feed which corresponds to the setting of the switch 5 on the arm 8 of the runner.

If it is desired to change over with this apparatus to the mode of operation of the apparatus of FIG. 1, it is sufficient to arrest the runner 9 permanently with respect to the rod 6.

According to FIG. 2, the tripping device 4 is provided with a writing finger which registers the fluctuations of weight with time on a slowly-revolving drum 12.

According to FIG. 3, a number of cages 13a, 13b... and 14a, 14b are provided. An apparatus 15' for feed supply runs around this cage battery in the direction shown; in the present case, it is a feed chain. It is charged by a metering apparatus D. According to the invention, the first cage 14a and the last cage 13a are designed such that the weight of the animals in these cages is continuously monitored, the cage 13a being the one which determines the end of the feeding periods.

Figure 4:
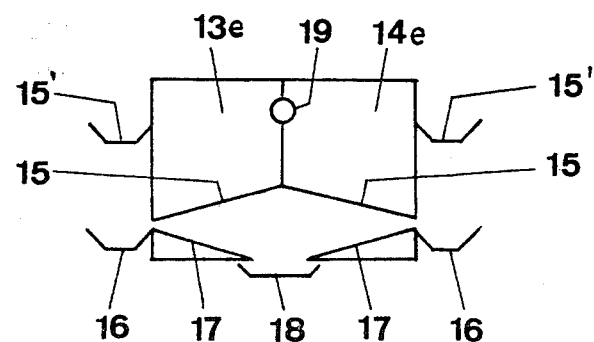
FIG. 4, a section along the line IV—IV in FIG. 3.

FIG. 4 illustrates the basic construction of the cages according to FIG. 3. Each contains a gently inclined floor 15, which leads to a conveyor 16 for removing the eggs. The floors 15 are perforated, so that the droppings fall onto inclined surfaces 17 below and from there can reach a conveyor 18. Furthermore, a common water supply 19 is provided.

The invention can likewise be used for the feeding of other animals, the keeping of which is based on corresponding conditions.

The embodiments of the invention in which an exclusive property or privilege is claimed are defined as follows:

1. A process for feeding a large number of egg laying poultry confined in a number of enclosures and from which the dung and eggs are continuously removed, comprising the steps of: providing a feeding means time controlled to normally provide feed to said poultry during a predetermined time period of each day; determining the average desired weights of said poultry and the weight of feed required for them during feeding to reach a weight of a predetermined value; selecting a small number of said poultry and while feeding the entire large number during said controlled time period monitoring the weights of said selected small number; and terminating the feeding of the entire large number before the end of said controlled time period in response to said weight of said small number reaching said predetermined value.

2. The process according to claim 1 characterized in that the predetermined value is adjustable.

3. The process according to claim 1, characterized in that the predetermined value is an absolute weight limit.

4. The process according to claim 1, characterized in that the predetermined value is the sum of the initial weight of the poultry at the beginning of the feeding process and of the predetermined weight of feed.

5. Apparatus for feeding a large number of poultry including a battery of cages, each cage adapted to confine a number of poultry, a feeding means for supplying feed to all of said poultry in said cages during a feeding cycle, said feeding means having a control circuit with a timer control means which normally controls the time feed is provided to said poultry during a predetermined time period of each day; each of said cages having a grid floor for passage of dung and apparatus for removal of eggs, the improvement comprising at least one of said cages having its grid floor formed as a load-carrier for actuating a shut off control means; said control circuit including a shut off control means adapted for terminating the supply of feed to said poultry during said predetermined feeding period; said shut off control means being actuated by said grid floor whereby the weight exerted on said floor by said poultry in said one cage terminates the feeding for all the poultry in all of the cages of said battery for such feeding period; said shut off control means being set for such termination in response to weight of a predetermined value determined by a desired weight of the poultry in said one cage and a weight of feed required for them during feeding to reach said weight of predetermined value.

6. Apparatus according to claim 5, characterized in that the control means can be set to actuate said feeder means at different weights.

7. Apparatus according to claim 5, characterized by said shut off control means is a switch in said control circuit and a means for tripping said switch; said tripping means being responsive to the weight exerted on said grid floor and said tripping means being adjustable so that it can be adjusted at the start of said feeding cycle to trip at different distances said grid floor moves in response to the weight of the poultry in said one cage.

8. Apparatus according to claim 7, characterized in that the tripping means responsive to the movement of said grid floor forms a driver-stop for a spring-biased member which carries the switch and is spring-loaded in a direction to adjust the position of the switch for tripping at a high weight, said member adapted to be fixed at the beginning of the feeding period.

9. Apparatus according to claim 5, characterized in that said one cage represents the last of a battery of cages supplied feed by said feeder means at the start of said feeder cycle.

10. Apparatus according to claim 9, characterized in that at least one other cage is provided with a grid floor formed as a load carrier for actuating said control means, said other cage being the first of the cages of said battery to be supplied feed at the start of said feeder cycle.

* * * * *